(12) United States Patent
Borenstein

(10) Patent No.: US 6,774,597 B1
(45) Date of Patent: Aug. 10, 2004

(54) APPARATUS FOR OBSTACLE TRAVERSION

(75) Inventor: Johann Borenstein, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 10/318,452

(22) Filed: Dec. 12, 2002

Related U.S. Application Data

(63) Continuation-in-part of application No. 09/821,867, filed on Mar. 30, 2001, now Pat. No. 6,512,345.

(51) Int. Cl.[7] .................................................. B25J 5/00
(52) U.S. Cl. ............. 318/568.12; 318/567; 318/568.16; 180/8.7; 180/9.21; 180/9.32; 901/1
(58) Field of Search ............................ 318/567, 568.12, 318/568.16; 180/8.7, 9.32, 9.21; 901/1

(56) References Cited

U.S. PATENT DOCUMENTS

| | | | |
|---|---|---|---|
| 4,527,650 A | | 7/1985 | Bartholet |
| 4,738,583 A | | 4/1988 | Macconochie et al. |
| 4,872,524 A | | 10/1989 | O'Connor |
| 4,932,831 A | * | 6/1990 | White et al. ................. 414/732 |
| 5,145,130 A | | 9/1992 | Purves |
| 5,255,753 A | | 10/1993 | Nishikawa et al. |
| 5,257,669 A | | 11/1993 | Kerley et al. |
| 5,351,626 A | | 10/1994 | Yanagisawa |
| 5,351,773 A | | 10/1994 | Yanagisawa |
| 5,363,935 A | * | 11/1994 | Schempf et al. ........... 180/93.1 |
| 5,423,708 A | | 6/1995 | Allen |
| 5,644,204 A | | 7/1997 | Nagle |
| 5,758,734 A | | 6/1998 | Hong et al. |
| 5,807,011 A | | 9/1998 | Hong et al. |
| 5,857,533 A | | 1/1999 | Clewett |
| 6,068,073 A | | 5/2000 | Roston et al. |
| 6,105,695 A | | 8/2000 | Bar-Cohen et al. |
| 6,113,343 A | * | 9/2000 | Goldenberg et al. ........ 414/729 |
| 6,484,601 B1 | | 11/2002 | Arrichiello |
| 6,512,345 B2 | * | 1/2003 | Borenstein et al. .... 318/568.12 |

OTHER PUBLICATIONS

"Development of Mobile Inspection Robot for Rescue Activities: MOIRA" by Koichi Osuka and Hiroshi Kitajima, Proceedings of the 2003 IEEE/RSJ Intl. Conference on Intelligent Robots and Systems, Las Vegas, Nevada, Oct. 2003, p. 3373–3377.

"Modeling, Identification, and Control of a Pneumatically Actuated, Force Controllable Robot" by James E. Bobrow and Brian W. McDonell, IEE Transactions on Robotics and Automation, vol. 14, No. 5, Oct. 1998, p. 732–742.

"Towards High–Speed, Motion Control of Pneumatic Actuators With Low–Cost Valves" by W. Brockmann and J. Kohne, 4th Int. Conference on Climbing and Walking Robots CLAWAR, Karlsruhe, Germany 2001, p. 339–346.

"An Experimental Comparison Between Several Pneumatic Position Control Methods" by S. Chillari, S. Guccione and G. Muscato, Proceedings of the 40th IEEE Conf. on Decision and Control, Orlando, Florida, Dec. 2001, p. 1168–1173.

(List continued on next page.)

*Primary Examiner*—Rina Duda
(74) *Attorney, Agent, or Firm*—Harness, Dickey & Pierce, P.L.C.

(57) ABSTRACT

An apparatus for traversing obstacles having an elongated, round, flexible body that includes a plurality of drive track assemblies. The plurality of drive track assemblies cooperate to provide forward propulsion wherever a propulsion member is in contact with any feature of the environment, regardless of how many or which ones of the plurality of drive track assemblies make contact with such environmental feature.

20 Claims, 7 Drawing Sheets

OTHER PUBLICATIONS

"A Tele–Operated Semi–Intelligent Climbing Robot For Nuclear Applications" by S.Glat, B.L. Luk, D.S. Cooke and A.A. Collie, Department of Electrical and Electronic Engineering, University of Portsmount, Portsmouth Technology Consultants Ltd, Havant, England, 1997 IEEE, p. 118–123.

"Introduction to Robotics" Addison–Wesley Publishing Company, Inc. 1989, p. 226–235.

"Application of a Maximum Stiffness Rule for Pneumatically Driven Legs on a Walking Robot" by Grzegorz Granosik and Edward Jezierski, Proc. of 2nd Int. Conference on Climbing and Walking Robots, Portsmouth, UK 1999, p. 213–218.

"The Selection of Mechanical Actuators Based on Performance Indices" by J.E. Huber, N.A. Fleck and M.F. Ashby, Proc. of the Royal Society of London, Series A. 453, UK 1997, pp. 2185–2205.

"Optimization of the Control Parameters of a Pneumatic Servo Cylinder Drive Using Genetic Algorithms" by Yong–Soo Jeon, Chung–Oh Lee, and Ye–Sun Hong, Control Eng. Practice, 1998, vol. 6, p. 847–853.

"A Linear Time Varying Model for On–Off Valve Controlled Pneumatic Actuators" by C. Kunt and R. Singh, Transactions of the ASME, Journal of Dynamic Systems, Measurement and Control, 1990, vol. 112, p. 740–747.

"An Analysis of a Pneumatic Servo System and Its Application to a Computer–Controlled Robot" by S. Liu and J.E. Bobrow, Transactions of the ASME, Journal of Dynamic Systems, Measurement and Control, 1988, vol. 110, p. 228–235.

"Practical Design of a Sliding Mode Controller for Pneumatic Actuators" by S.R. Pandian, Y. Hayakawa, Y. Kanazawa, Y. Kamoyama, S. Kawamura, Transactions of the ASME, Journal of Dynamic Systems, Measurement and Control, 1997, vol. 119, No. 4, p. 666–674.

"Comparison Between Linear and Nonlinear Control of an Electropneumatic Servodrive" by E. Richard and S. Scavarda, Transactions of the ASME, Journal of Dynamic Systems, Measurement and Control, 1996, vol. 118, p. 245–252.

"Study of Pneumatic Processes in the Continuous Control of Motion With Compressed Air I, II," by J.L. Shearer, Transactions of the ASME, Feb. 1956, p. 233–249.

"Position Control of a Pneumatic Rodless Cylinder Using Sliding Mode M–D–PWM Control the High Speed Solenoide Valves" by M.C. Shih and M.A. Ma, JSME International Journal, Series C, 1998, vol. 41, No. 2, p. 236–241.

"Continuous Sliding Mode Control of a Pneumatic Actuator" by B.W. Surgenor and N.D. Vaughan, Transactions of the ASME, Journal of Dynamic Systems, Measurement and Control, Sep. 1997, vol. 119, p. 578–581.

"Accurate Position Control of a Pneumatic Actuator Using On/Off Solenoid Valves" by R.B. vanVarseveld and G.M. Bone, IEEE/ASME Transactions on Mechatronics, 1997, vol. 2, No. 3, p. 195–204.

"A Safer Way to Search Disaster Sites" by Jennifer Weston, IEEE Robotics & Automation Magazine, Sep. 2000, p. 56–57.

"Design and Motion Planning of a Mechanical Snake" by Yanson Shan and Yoram Koren, IEEE Transactions on Systems, Man, and Cybernetics, vol. 23, No. 4, Jul./Aug. 1993, p. 1091–1100.

"Design of In–Pipe Inspection Vehicles for <25, <50, <150 Pipes" by Shigeo Hirose, Hidetaka Ohno, Takeo Mitsui, Kijchi Suyama, IEEE International Conference on Robotics & Automation, Detroit, MI May 1999, p. 2309–2314.

"Limbless Locomotion: Learning to Crawl" by Kevin Dowling, IEEE International Conference on Robotics & Automation, Detroit, MI May 1999, p. 3001–3006.

"Limbless Locomotion: Learning to Crawl with a Snake Robot" by Kevin J. Dowling, Advised by William L. Whittaker, Dec. 1997.

"GMD–Snake2: A Snake–Like Robot Driven by Wheels and a Method for Motion Control" by Bernhard Klaassen, Karl L. Paap, IEEE International Conference on Robotics & Automation, Detroit, MI May 1999, p. 3014–3019.

"Biomimetic Design and Fabrication of a Hexapedal Running Robot" by Jonathan E. Clark, Jorge G. Cham, Sean A. Bailey, Edward M. Froehlich, Pratik K. Nahata, Robert J. Full, Mark R. Cutkosky, IEEE International Conference on Robotics & Automation, Seoul, Korea, May 21–26, 2001, p. 3643–3649.1.

"Design and Simulation of a Cockroach–Like Hexapod Robot", by G.M. Nelson, R.D. Quinn, R.J. Bachmann, W.C. Flannigan, IEEE International Conference on Robotics and Automation, Albuquerque, New Mexico, Apr. 1997.

"Design and Control of a Mobile Robot With an Articulated Body" by Shigeo Hirose, Akio Morishima, The International Journal of Robotics Research, vol. 9, No. 2, Apr. 1990, p. 99–113.

"Controlling a Multijoint Robot for Autonomous Sewer Inspection" by K.–U. Scholl, V. Kepplin, K. Berns, R. Dillmann, IEEE International Conference on Robotics & Automation, San Francisco, CA Apr. 2000, p. 1701–1706.

"PackBot" Man Portable Tracked Ground Vehicle, iRobot Corporation, http://www.irobot.com/rd/p08_PackBot.asp, Jan. 15, 2003, 4 pages.

"Remotec Andros", Remotec, Inc., http://www.remotec–andros.com/, Jan. 22, 2003, 9 pages.

"Cooperative Robot (Gunryu) Composed of Autonomous Segments," http://mozu.mes.titech.ac.jp/research/colony/gr/gr.html, Jan. 21, 2003, 6 pages.

"Connected Crawler Vehicle for Inspection (Souryu I, II)", http://mozu.mes.titech.ac.jp/research/snake/soryu/index.html, Jan. 21, 2003, 3 pages.

"Millibot Trains for Enhanced Mobility" H. Benjamin Brown, Jr., J. Michael Vande Weghe, Curt A. Bereton, and Pradeep K. Khosla, IEEE/ASME Transactions on Mechatronics, vol. 7, No. 4, Dec. 2002, p. 452–461.

* cited by examiner

APPARATUS FOR OBSTACLE TRAVERSION

CROSS-REFERENCE TO RELATED APPLICATIONS

This application is a continuation-in-part of U.S. patent application Ser. No. 09/821,867 filed on Mar. 30, 2001 now U.S. Pat. No. 6,512,345. The disclosure of the above application is incorporated herein by reference.

STATEMENT OF GOVERNMENTAL SUPPORT

This invention was made with Government support under Award No. DE-FG04-86NE3796 awarded by the U.S. Department of Energy. The Government has certain rights in this invention.

FIELD OF THE INVENTION

The present invention generally relates to an apparatus for traversing obstacles and, more particularly, to an apparatus for traversing obstacles having an elongated, flexible body, and a drive track propulsion system.

BACKGROUND OF THE INVENTION

Robotic vehicles are often used to navigate or traverse varying terrain. As is well known, wheeled robotic vehicles, both large and small, are particularly well adapted for travel over relatively smooth terrain, such as roads and smooth floors. However, it is often necessary for robots to traverse terrain that is not smooth, such as stairs or curbs. Moreover, it is often necessary for robots to traverse terrain that may pose a danger to humans, such as those situations presenting an environmental risk, military risk, or the like. Often robotic devices are useless in these dangerous situations because of their inability to successfully and reliably traverse any severely broken and/or fractured ground that they may encounter. Attempts have been made to overcome the numerous disadvantages of wheeled robotic vehicles in these situations by simply increasing the diameter of the wheels or adding tank crawler tracks to increase the ability of the robotic device to traverse large objects or spans. However, these solutions include additional disadvantages, such as increasing the overall size of the vehicle, which may inhibit the robot's ability to pass through small openings.

Furthermore, many robots suffer from being rendered immobile as a result of a rollover or other situation that prevents contact of their propulsion member(s) on the ground surface. That is, should a wheeled robot encounter a grade sufficient to roll it on its side, the wheels are no longer capable of propelling the robot. In terrains that pose a risk to humans, such rollovers may render the robot unrecoverable.

Accordingly, there exists a need in the relevant art to provide an apparatus capable of traversing severely broken and/or fractured ground. Further, there exists a need in the relevant art to provide an apparatus capable of traversing severely broken and/or fractured ground without unduly limiting the ability to pass through small openings. Still further, there exists a need in the relevant art to provide an apparatus capable of engaging its environment at any point about its periphery to minimize the possibility of the apparatus becoming immobile. Furthermore, there exists a need in the relevant art to provide an apparatus for traversing obstacles that overcomes the disadvantages of the prior art.

SUMMARY OF THE INVENTION

According to the principles of the present invention, an apparatus for traversing obstacles having an advantageous design is provided. The apparatus includes an elongated, round, flexible body that includes a plurality of drive track assemblies. The plurality of drive track assemblies cooperate to provide forward propulsion wherever a propulsion member is in contact with any feature of the environment, regardless of how many or which ones of the plurality of drive track assemblies make contact with such environmental feature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
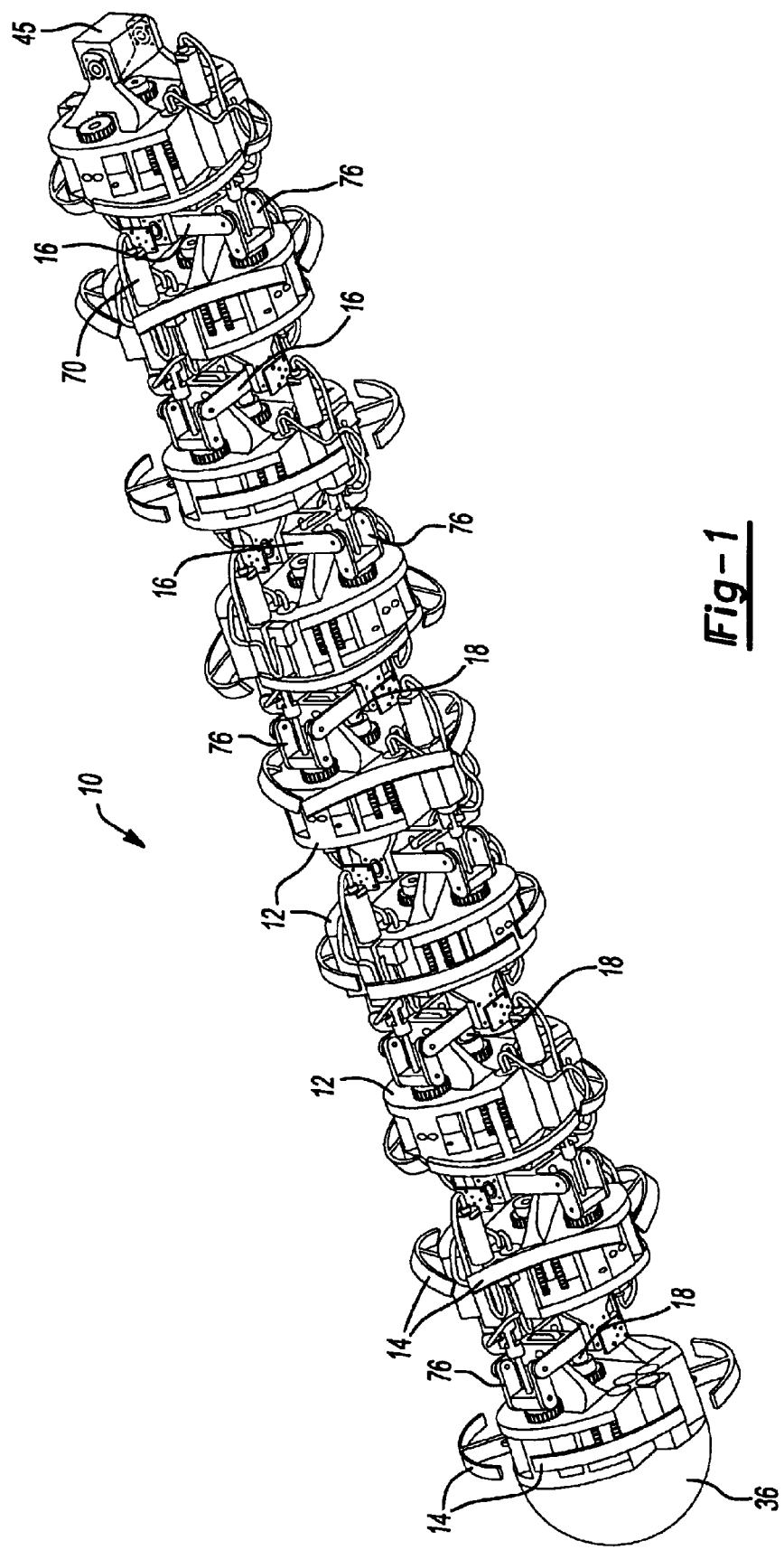
FIG. 1 is a perspective view illustrating an apparatus for traversing obstacles according to a first embodiment of the present invention.

The following description of the preferred embodiment is merely exemplary in nature and is in no way intended to limit the invention, its application, or uses.

Referring to the drawings, an apparatus 10 for traversing obstacles according to a first embodiment of the present invention is illustrated having a plurality of identical segments 12. Each of the plurality of segments 12 includes a plurality of articulating leg mechanisms 14 disposed about the periphery of each segment 12. According to the present embodiment, each of the plurality of segments 12 includes four articulating leg mechanisms 14 evenly spaced at 90° intervals about the periphery of each segment 12 to provide a generally continuous series of propulsion members. However, it is anticipated that any number of articulating leg mechanisms may be used so long as they generally extend around the outer diameter or periphery of each segment 12. By positioning articulating leg mechanisms 14 continuously about the periphery of segment 12, apparatus 10 is more likely to engage a feature within the environment to provide reliable locomotion. This ability to engage an environmental feature, whether it be the ground surface, wall protrusion, ceiling cavity, or the like, irrespective of its physical orientation provides apparatus 10 with a reliable means of continued propulsion. Adjacent segments 12 are joined together via an articulating joint 16 and a drive shaft 18.

Apparatus 10 may include any number of identical segments 12 connected to each other in a serial fashion. The number of segments 12 required depends on the terrain that must be covered. Moreover, as a result of their identical construction, segments 12 may be easily added, removed, or exchanged with other robots. For illustration and discussion purposes, the figures contained herein comprise nine individual segments 12.

Figure 4:
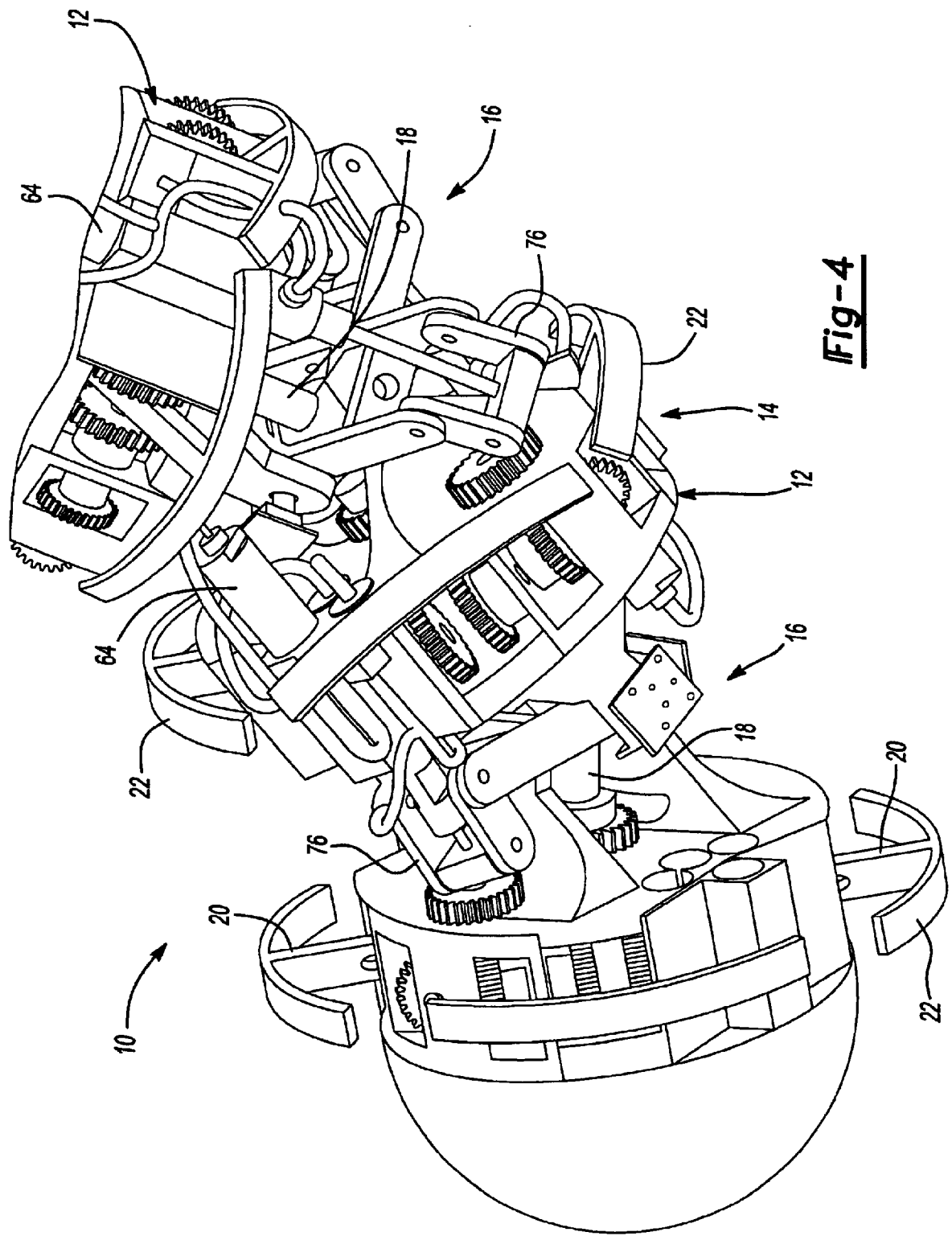
FIG. 4 is an enlarged perspective view illustrating the actuation of a joint between two segments of the apparatus.
Figure 5:
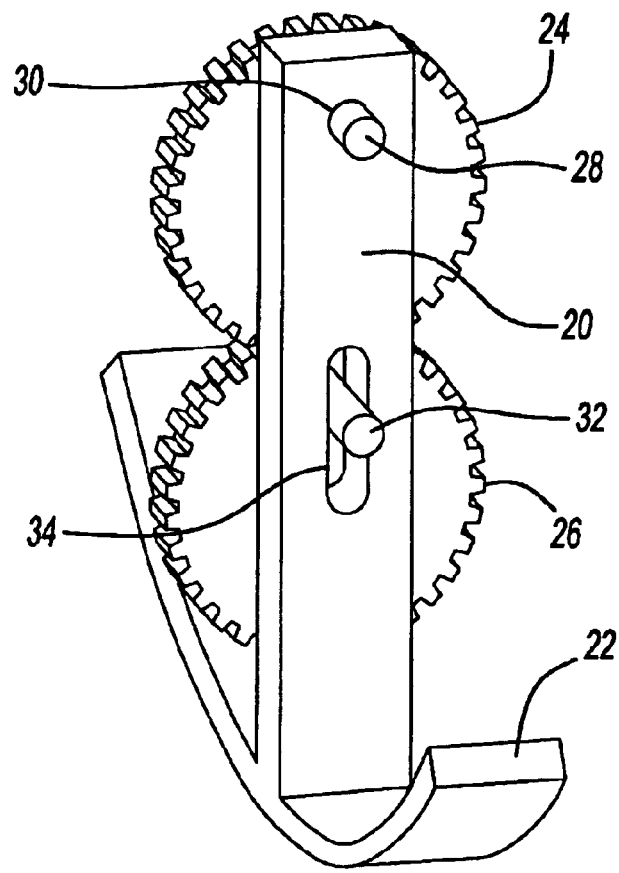
FIG. 5 is a perspective view illustrating an articulating leg mechanism according to the principles of the present invention.

Referring in particular to FIGS. 4 and 5, each of the plurality of articulating leg mechanisms 14 includes a leg 20, a foot 22, a driven gear 24, and a drive gear 26. As can be seen in FIG. 4, articulating leg mechanism 14 includes only one degree of freedom, providing a simplified propulsion system. That is, by having only one degree of freedom per leg, instead of the multiple degrees of freedom like many other legged vehicles, the number of required actuators is reduced, thereby reducing the weight, complexity, and cost of apparatus 10.

Figure 3:
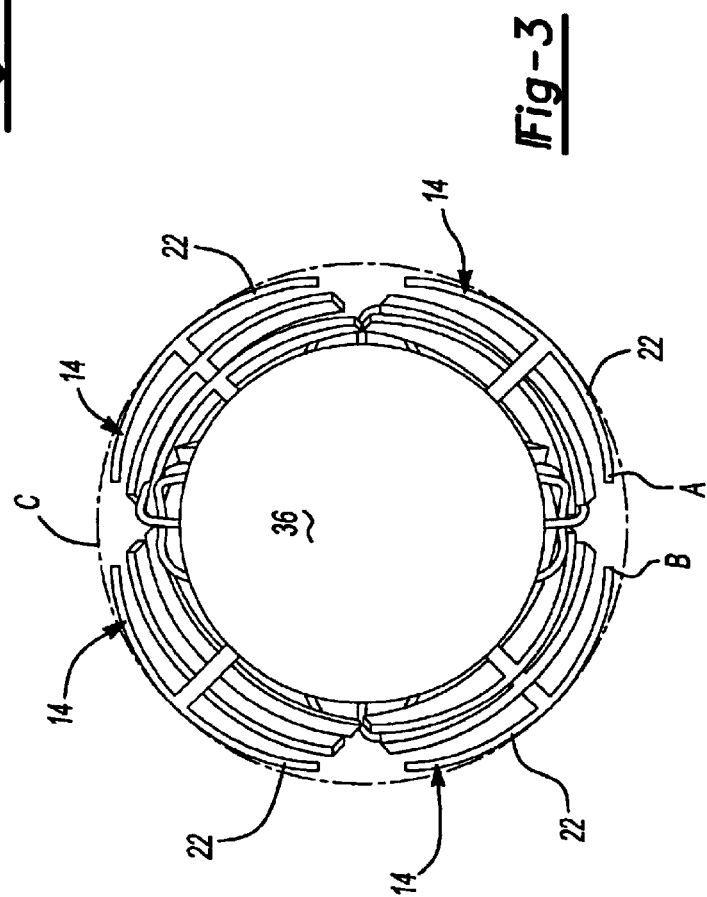
FIG. 3 is a front view illustrating the apparatus.

As best seen in FIG. 3, foot 22 is generally arcuate in shape so as to be generally complimentary to an overall outer shape of apparatus 10. However, the radius of curvature of each foot 22 is preferably less than the radius of curvature of a circle C (FIG. 3) swept around apparatus 10 and intersects the outermost point of each foot 22. This arrangement minimizes the potential for sideways rolling of apparatus 10. However, as described above, should apparatus 10 nonetheless rollover, at least some of articulating leg mechanisms 14 disposed about the periphery of each segment 12 will engage a feature of the environment for continued locomotion.

Figure 9:
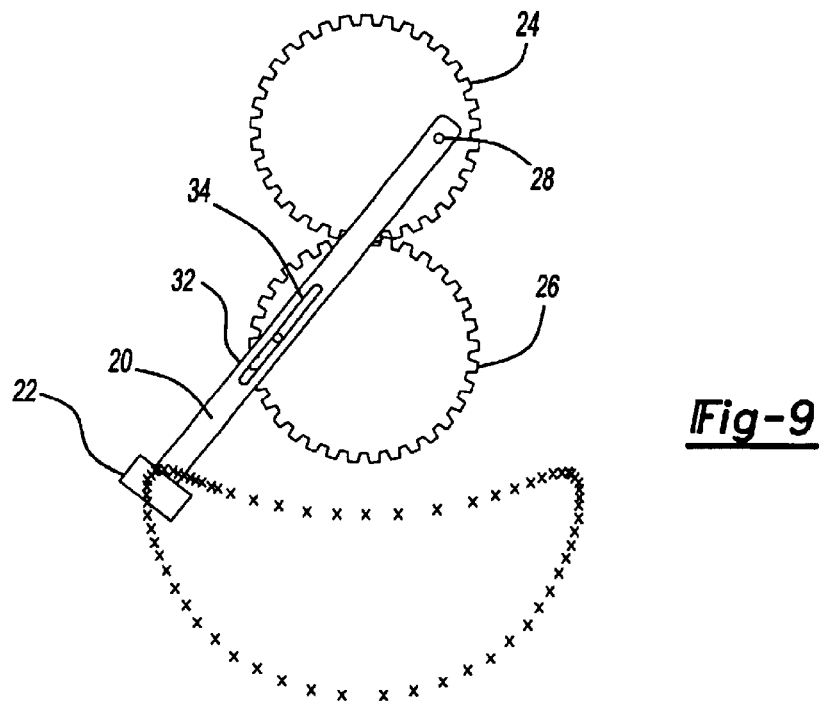
FIG. 9 is a schematic view illustrating the motion trajectory of the articulating leg mechanism according to the principles of the present invention.

The trajectory of foot 22 is determined by the mechanism illustrated in FIG. 5. Specifically, driven gear 24 enmeshingly engages drive gear 26. Driven gear 24 includes a pivot pin 28 that is operably received within an aperture 30 of leg 20. Similarly, drive gear 26 includes a cam pin 32 that is operably received within a cam slot 34 of leg 20. As driven gear 24 rotates in a first direction and thereby drives drive gear 26 in an opposite direction, pivot pin 28 acts within aperture 30 to drive leg 20 in an extending and retracting motion. Simultaneously, cam pin 32 cammingly engages cam slot 34 and drives leg 20 in a sweeping, shoveling, or rotating motion, as illustrated in FIG. 9. Thus, the trajectory of foot 22 generally includes a lowered portion that is in contact with the ground surface for applying a propelling force to move apparatus 10 and a raised portion that is not in contact with the ground surface to allow for forward placement of foot 22 without interfering with the propelling force applied by other feet 22.

Apparatus 10 further includes a "head" segment 36. Head segment 36 is identical to segment 12; however, head segment 36 further includes a plurality of sensors 38 (only one shown) and an onboard computer/controller 40. The plurality of sensors 38 may be used to gather environmental data, surveillance data, or any number of other uses. Onboard computer 40 is used to control the movement of apparatus 10 and to provide a means of controlling and/or communicating with the various systems of apparatus 10. To this end, onboard computer 40 preferably includes a controller area network (CAN) interface. In operation, onboard computer 40 receives environmental data, surveillance data, or any number of other data from other onboard sensors located throughout apparatus 10. The data is then carried to onboard computer 40 via a serial CAN bus. The CAN may then be used to provide a control signal to the plurality of articulating leg mechanisms 14 of apparatus 10. This arrangement reduces the number of electrical wires needed throughout apparatus 10. The mechanical operation of head segment 36 is identical to that of segments 12. Therefore, in the interest of brevity, only a single segment 12 will be discussed in detail, except as otherwise noted.

Figure 6:
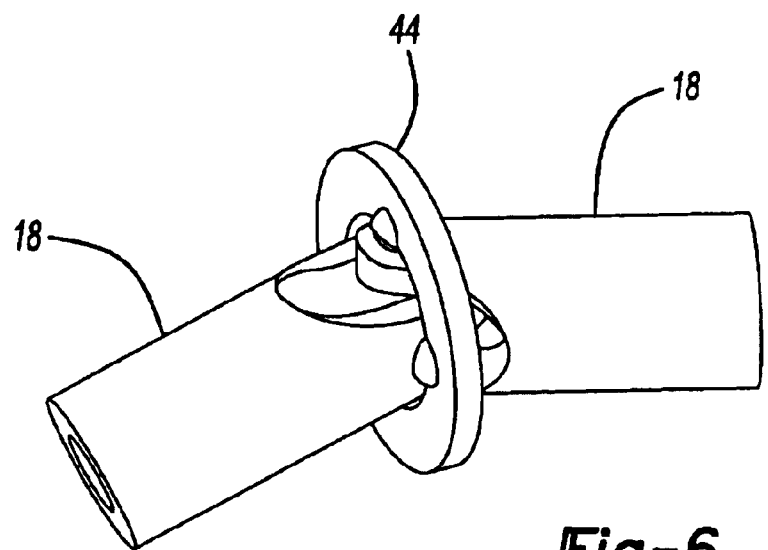
FIG. 6 is a perspective view of a universal coupling interconnecting drive shafts of adjacent segments of the apparatus.

Apparatus 10 further includes drive shaft 18. Drive shaft 18 provides input power to each of the plurality of articulating leg mechanisms 14 via a transmission 42 disposed in each segment 12. Drive shaft 18 is a single drive shaft that kinematically links each segment 12 and, more particularly, each articulating leg mechanism 14. To this end, drive shaft 18 includes a universal joint 44 (FIG. 6) that allows power transfer independent of the relative orientation of segments 12. This arrangement enables all articulating leg mechanisms 14 to be driven by a single actuator, generally indicated at 45, which supplies torque to drive shaft 18. It should be appreciated that since all articulating leg mechanisms 14 are kinematically linked by single drive shaft 18, the phase differences between each articulating leg mechanism 14 are fixed. That is, the phase relationship of articulating leg mechanisms 14, which defines the gait of apparatus 10, will remain whatever it was when the robot was assembled.

The use of single actuator 45 for supplying power to all articulating leg mechanisms 14 has numerous advantages. Firstly, actuator 45 can be placed on a specially designed segment (not shown) at the tail end of apparatus 10 in such a way as to minimize the load on articulating leg mechanisms 14, thus reducing the required size of the actuator. Secondly, multiple actuators weigh more than a single actuator that produce the same amount of power, thus the overall weight of apparatus 10 is reduced by using a single actuator for all articulating leg mechanisms 14. Thirdly, the use of high energy density power sources, such as a small gasoline engine, might be feasible. The energy density of a small gasoline engine with tank is about one order of magnitude greater than that of a comparable electric motor with lithium-ion battery.

Figure 7:
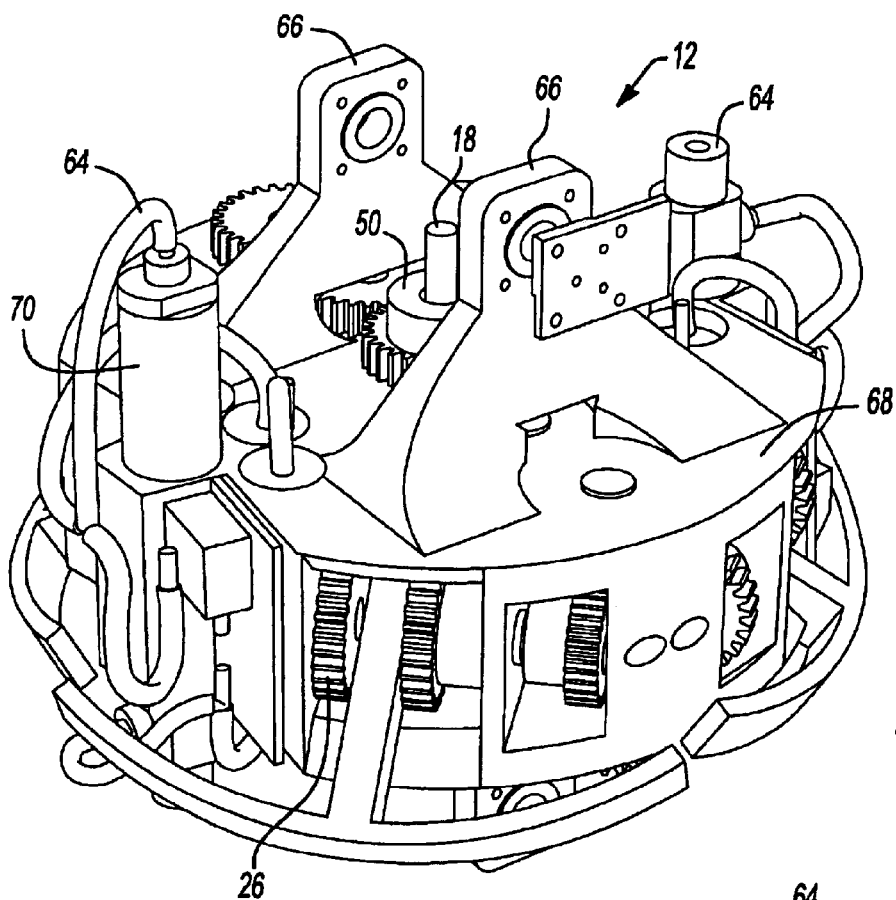
FIG. 7 is a perspective view of a transmission for transmitting power from the drive shaft to the drive leg mechanism.
Figure 8:
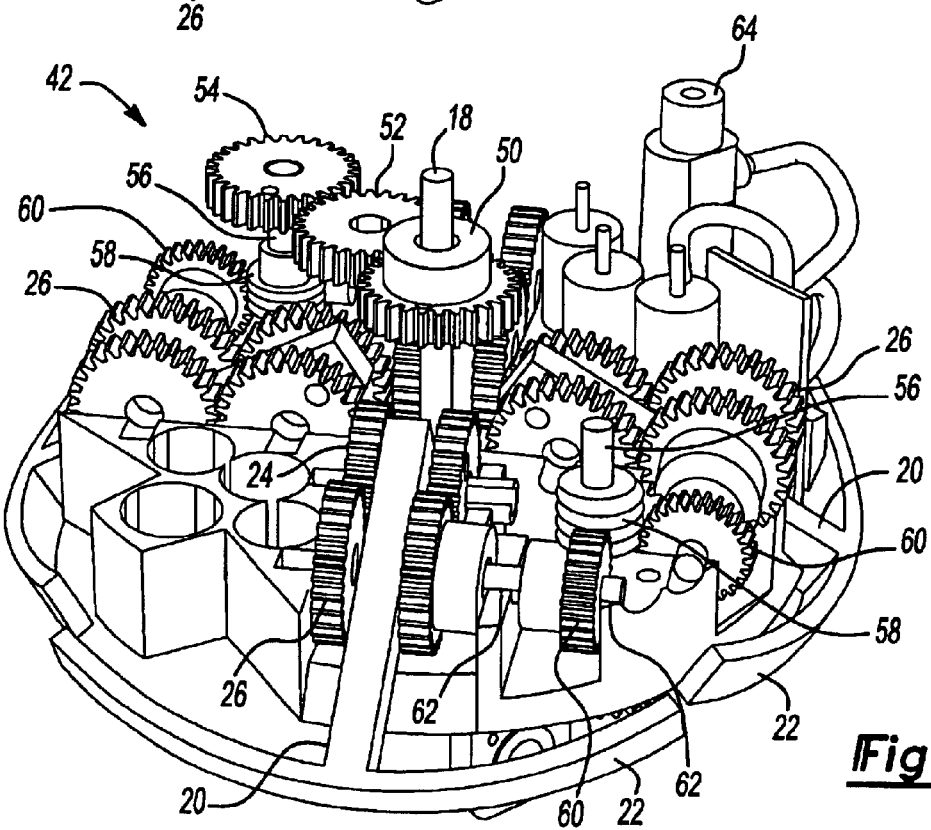
FIG. 8 is a perspective view of the transmission of FIG. 7 having portions removed for clarity.

Referring now to FIGS. 7 and 8, transmission 42 interconnects drive shaft 18 with an input shaft 62 of each articulating leg mechanism 14 of each segment 12. Transmission 42 includes an inner spur gear 50 that is fixedly coupled to drive shaft 18 for rotation therewith. Inner spur gear 50 meshes with two idler spur gears 52 (only one shown), which each mesh with an outer spur gear 54 (only one shown). Outer spur gear 54 is fixedly coupled to a shaft 56. Also fixedly coupled to shaft 56 is a worm gear 58. Worm gear 58 meshes with two worm gears 60. Each of these four worm gears 60 is fixedly coupled to input shaft 62 of articulating leg mechanism 14. Input shaft 62 is fixed for rotation with drive gear 26, which thus drives driven gear 24 and rotates leg 20 and foot 22 through a five-bar geared mechanism as described above to produce the trajectory illustrated in FIG. 9. Alternatively, inner spur gear 50 and outer spur gear 54 may each be replaced with a pulley and belt system for power transfer.

Figure 10:
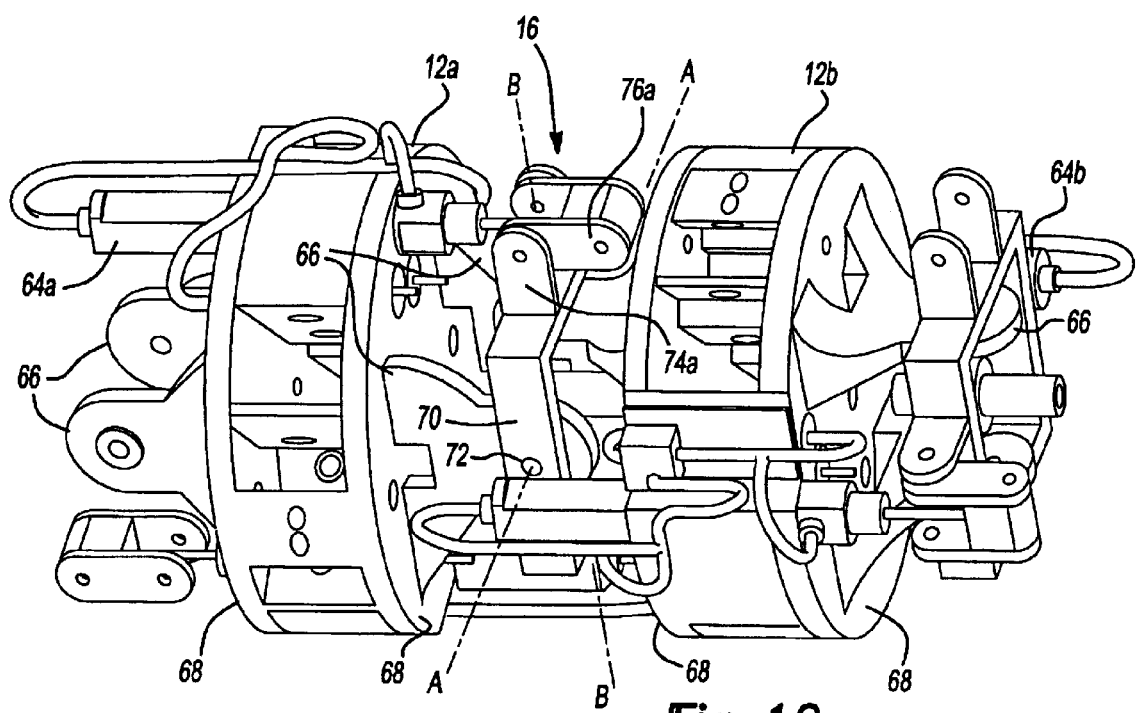
FIG. 10 is a perspective view of an articulating joint according to the principles of the present invention.

Adjacent segments 12 of apparatus 10 are connected using articulating joints 16 (FIGS. 4 and 10). Specifically, for discussion purposes, adjacent segments 12 will be referred to as segment 12a and segment 12b in FIG. 10 only. Although, it should be appreciated that segments 12a and 12b are identical in construction. Each articulating joint 16 comprises two revolute joints, generally indicated as axis A and axis B, whose axes intersect at an intersection point of articulating joint 16. These two revolute joints are separated by 90° to provide the two degrees of freedom. As best seen in FIG. 10, these two degrees of freedom are each independently controlled with an actuator or pneumatic piston 64a and 64b (generally indicated as 64 elsewhere). Each segment 12a and 12b include a pair of arm supports 66 extending from end surfaces 68 thereof (FIGS. 7 and 10). The pair of arm supports 66 are pivotally journalled to a floater bracket 70 via a pair of pivot pins 72. Articulation of joint 16 about axis A is caused when actuator 64a, which is mounted on segment 12a, pushes or pulls a bracket 74a by means of a rotating crank 76a. Accordingly, this actuation rotates segment 12a relative to floater bracket 70 about axis A.

Similarly, articulation of joint 16 about axis B is caused when actuator 64b, which is mounted on segment 12b, pushes or pulls a bracket 74b (located on a backside in FIG. 10) by means of a rotating crank 76b (located on a backside in FIG. 10). Accordingly, this actuation rotates segment 12b relative to floater bracket 70 about axis B. Actuators 64a and 64b enable apparatus 10 to lift its front end on top of obstacles. This allows apparatus 10 to adjust to the contour of the terrain and overcome obstacles that are orders of magnitude larger than its step height.

A skin (not shown) may be applied around apparatus 10 to protect all internal parts from moisture or sand. However, in some applications, a skin may not be necessary.

Figure 2:
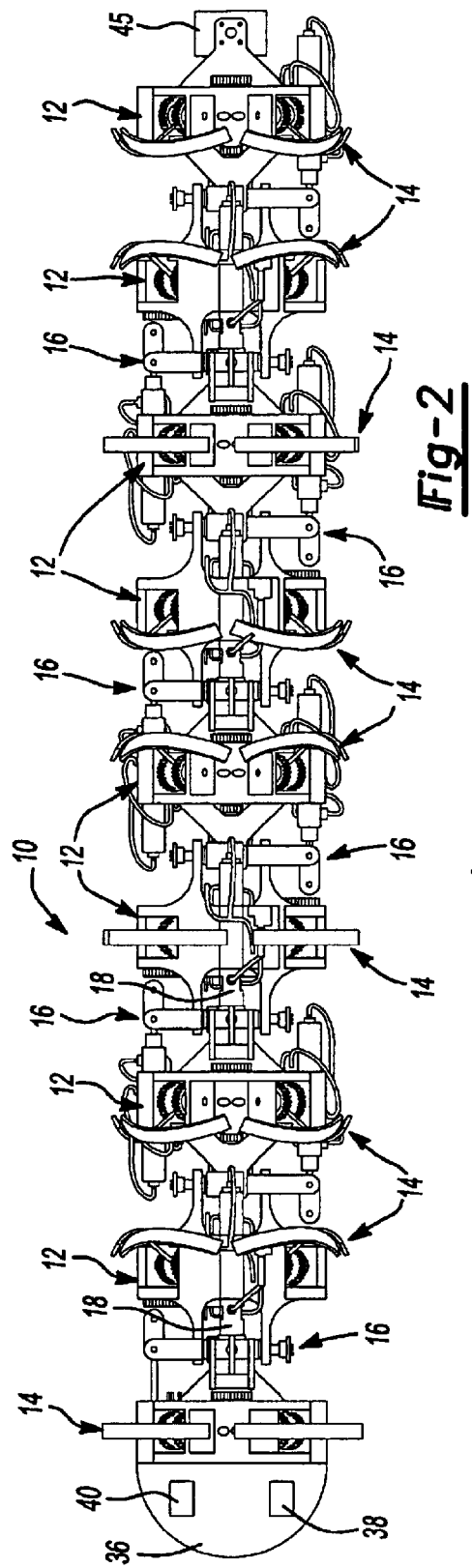
FIG. 2 is a side view illustrating the apparatus.

As best seen in FIGS. 2 and 3, apparatus 10 is illustrated as walking on a flat surface, for a simplified discussion model. However, it should be understood that apparatus 10 is capable of traversing rough terrain. As seen in FIG. 3, the front view of apparatus 10 shows that feet 22 of segment 12 touch the ground at two contact points A and B. This is due to the fact that the radius of curvature of feet 22 is smaller than the overall radius of curvature of apparatus 10, thereby producing generally flat surfaces extending between the ends of adjacent feet 22 on a single segment 12 (see FIG. 3). This arrangement reduces the tendency of the otherwise cylindrical robot (when all segments are aligned) to roll. However, it should be understood that these contact points may be at any point about the periphery of apparatus 10. For instance, should apparatus 10 span a fractured ground or fractured pipe, feet 22 of articulating leg mechanism 14 may engage a feature along the ceiling thereof to provide locomotion. Moreover, should apparatus 10 traverse a continuous pipe that is only slightly larger in diameter than apparatus 10, then all feet 22 disposed about each segment 12 would engage the walls thereof. Thus, each segment 12 may have multiple simultaneous contact points.

The particular gaits of apparatus 10 will now be described with general reference to FIG. 2, which illustrates a worm-like gait. For purposes of discussion, head segment 36 will be referred to as segment one while the last segment will be referred to as segment nine and the remaining segments numbered consecutively therebetween. Furthermore, the two feet 22 that are contacting the ground at each segment will be referred to as the right and left feet as apparatus 10 faces forward.

FIG. 2 illustrates a worm-like gait in that the plurality of articulating leg mechanisms 14 disposed on each segment 12 are synchronized to provide a simultaneous driving motion. That is, accordingly to the worm-like gate, all leg mechanisms 14 on a given segment 12 are in phase with the other leg mechanisms 14 on that given segment 12. However, adjacent segments 12 are out of phase with each other. For example, to achieve a worm-like gait, the left and right feet of segment one would be in a pre-driving position, the left and right feet of segment two would be in a driving position in contact with the ground surface, and the left and right feet of segment three would be in a post-driving position (see FIG. 2). Such a worm-like gait is particularly useful for burrowing and/or tunneling into soil.

Alternatively, an alternating tripod gait may be used and is particularly useful for traversing an above-ground surface. According to this alternating tripod gait, the right foot of segments one and seven, and the left foot of segment four all touch the ground simultaneously in generally a triangular pattern. The left foot of segments two and eight, and the right foot of segment five will be the next to touch the ground, and so forth. Accordingly, it should be appreciated that unlike the aforementioned worm-like gait, each articulating leg mechanism 14 is 180° out of phase with the adjacent leg mechanism of the same segment. This arrangement provides a very stable tripod support structure.

It should be appreciated that the particular gait employed depends, in part, on the terrain encountered. It is anticipated that onboard computer 40 and articulating leg mechanism 14 of apparatus 10 could be adapted to change the gait of apparatus 10 in accordance with the environmental conditions experienced.

Figure 11:
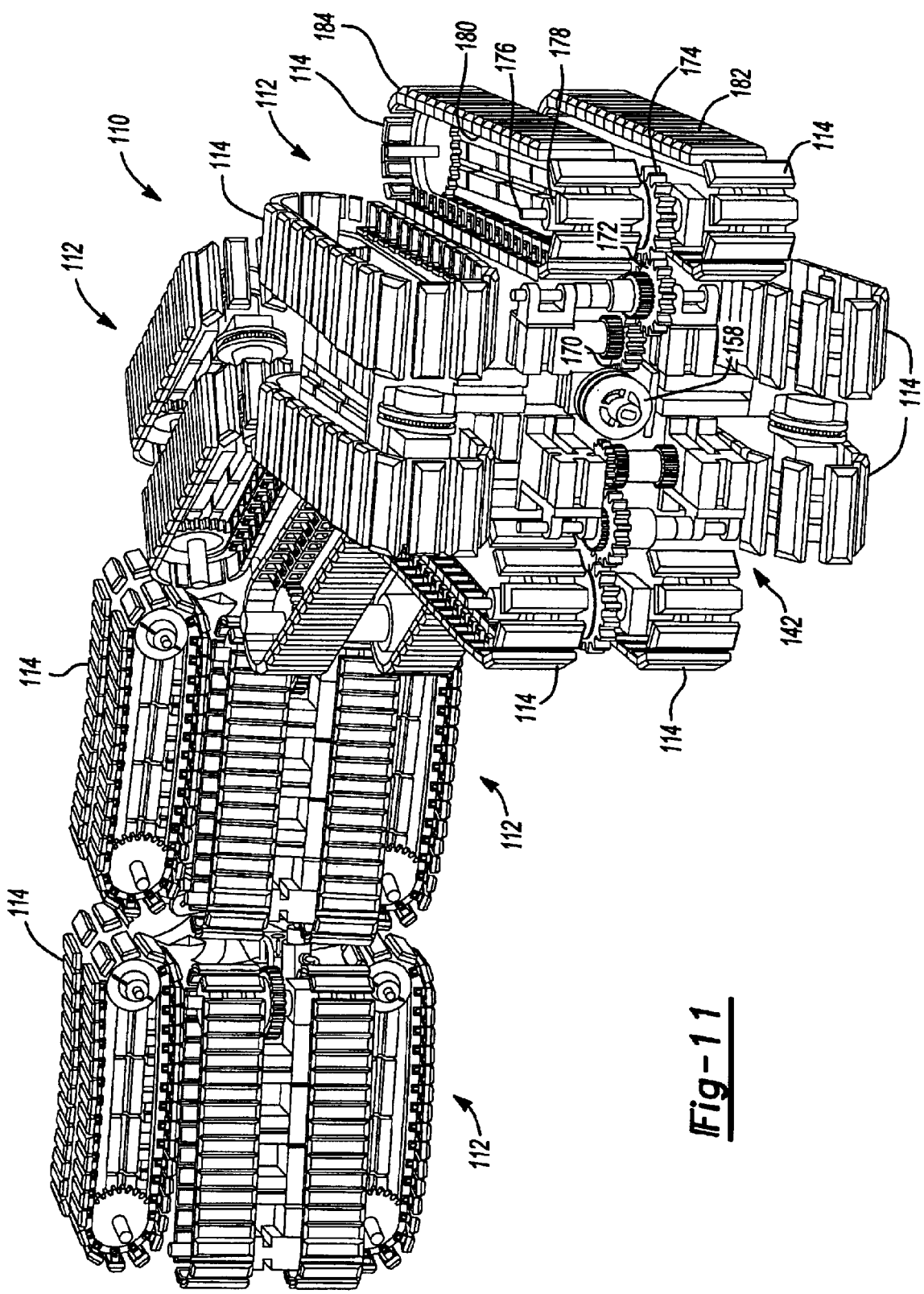
FIG. 11 is a perspective view illustrating an apparatus for traversing obstacles according to a second embodiment of the present invention.

Turning now to FIG. 11, an apparatus 110 for traversing obstacles according to a second embodiment of the present invention is illustrated having a plurality of identical segments 112. It should be appreciated that apparatus 110 is similar in construction to apparatus 10. Therefore, in the interest of brevity, only those areas that differ will be discussed in detail herein.

Each of the plurality of segments 112 includes a plurality of drive track assemblies 114 disposed about the periphery of each segment 112. Preferably, drive track assemblies 114 are arranged in pairs on each of the four sides of apparatus 110. However, it should be understood that a single drive track assembly may be used on each of the sides of apparatus 110. Specifically, according to the present embodiment, each of the plurality of segments 112 includes four pairs of drive track assemblies 114 evenly spaced at 90° intervals about the periphery of each segment 112 to provide a generally continuous series of propulsion members. By positioning drive track assemblies 114 continuously about the periphery of segment 112, apparatus 110 is more likely to engage a feature within the environment to provide reliable locomotion. This ability to engage an environmental feature, whether it is the ground surface, wall protrusion, ceiling cavity, or the like, irrespective of its physical orientation provides apparatus 110 with a reliable means of continued propulsion. Adjacent segments 112 are joined together via articulating joint 16 and drive shaft 18.

Apparatus 110 may include any number of identical segments 112 connected to each other in a serial fashion. The number of segments 112 required depends on the terrain that must be covered. Moreover, as a result of their identical construction, segments 112 may be easily added, removed, or exchanged with other robots. For illustration and discussion purposes, the figures contained herein comprise nine individual segments 112.

Still referring to FIG. 11, a transmission 142 interconnects drive shaft 18 with each drive track assembly 114 of each segment 12. Transmission 142 is similar to transmission 42 and includes a worm gear 158 driven in response to drive shaft 18. Worm gear 158 meshes with each drive track assembly 114 in an identical arrangement. Therefore, only one complete transmission system will be described. Worm gear 158 meshes with a first spur gear 170, which in turn meshes with a second spur gear 172. Second spur gear 172 meshes with a third spur gear 174. Third spur gear 174 is fixed to a track drive shaft 176 to drive track drive shaft 176 in response to rotation of third spur gear 174. Track drive shaft 176 preferably extends to both sides of third spur gear 174 and is fixed to a pair of driven gears 178 for rotation with track drive shaft 176. Each of the pair of driven gears 178 engages a corresponding rack 180 disposed along an inner surface of a flexible track member 182. Flexible track member 182 includes engaging treads 184 disposed along an outer surface thereof for engaging an environmental feature. Flexible track members 182 are driven around driven gear 178 and an alignment gear 184 disposed at an opposing end of track member 182. It should be understood that alignment gear 184 is not separately driven, but instead rotates in response to the driving of track member 182. Accordingly, each of the pair of track members 182, which are disposed on each side of apparatus 110, are driven by drive shaft 18 to ensure proper and reliable locomotion.

Preferably, the four pairs of drive track assemblies 114 disposed on each segment 112 are driven continuously such that if apparatus 110 rolls over, it can continue to be driven. However, it is anticipated that each pair of drive track assemblies 114 may be independently actuated to enable only a selective pair of drive track assemblies 114 to be used at any one time. This would enable power consumption to be reduced in applications requiring onboard power storage and prolonged operation. To this end, computer/controller 40 and at least one of the plurality of sensors 38 may be used to determine orientation of apparatus 110 and output a control signal. In response to this control signal, an engagement mechanism can be actuated to disengage first spur gear 170 from worm gear 158 or second spur gear 172 from first spur gear 170. The engagement mechanism may be a solenoid operated actuator capable of pivoting first spur gear 170 or second spur gear 172 out of engagement to enable track members 182 to rotate freely so as not to inhibit locomotion. It should be understood that other engagement and/or clutching devices may be used.

Accordingly, the apparatus of the present invention may find utility in a wide variety of applications. By way of non-limiting example, apparatus 10, 110 may be used for fully autonomous search for survivors of earthquakes underneath the rubble of collapsed buildings; military applications in very rugged terrain; mining and autonomous search for other natural resources in terrain that is not accessible to humans (i.e., jungles, mountains, etc.); autonomous burrowing in soft soil; monitoring potential underground radiation leakage of buried radioactive waste; nuclear disaster cleanup (e.g., Chernobyl) and sample retrieval; or research platform for studying many-legged locomotion. An additional benefit of using a plurality of pairs of drive track assemblies is the speed at which apparatus 110 can be propelled and the simple and reliable construction thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. An apparatus comprising:
   a plurality of segments;
   a plurality of articulating joints individually interconnecting at least a portion of said segments;
   a plurality of drive track assemblies operably coupled to each of said plurality of segments, said plurality of drive track assemblies generally disposed about a periphery of each of said plurality of segments to provide traction at any position about said periphery;
   a power source; and
   a power transmission system interconnecting said power source and at least a portion of said drive track assemblies to drive said at least a portion of said drive track assemblies.
2. The apparatus according to claim 1 wherein each of said plurality of drive track assemblies comprises:
   a continuous drive track;
   a drive gear operably coupled to said power transmission system;
   a driven gear enmeshingly engaging said drive gear; and
   a track gear fixed for rotation with said driven gear, said track gear enmeshingly engaging said continuous drive track to drive said continuous drive track to propel the apparatus.
3. The apparatus according to claim 1 wherein each of said plurality of drive track assemblies comprises:
   a continuous drive track having an environment engaging outer surface and a racked inner surface;
   a worm gear operably coupled to said power transmission system;
   a first gear enmeshingly engaging said worm gear;
   a second gear enmeshingly engaging said first gear;
   a third gear enmeshingly engaging said second gear, said third gear having a drive shaft fixed thereto for rotation therewith; and
   a pair of driven gears fixed to said drive shaft for rotation with said drive shaft, each of said pair of driven gears engaging said racked inner surface of said continuous drive track to drive said continuous drive track.
4. The apparatus according to claim 1 wherein a pair of said plurality of drive track assemblies is disposed on each of four sides of each of said plurality of segments to provide traction at any position about said periphery.
5. The apparatus according to claim 1 wherein said plurality of segments is identical and interchangeable.
6. The apparatus according to claim 1, further comprising:
   a head segment coupled to one of said plurality of segments; and
   a controller mounted in said head segment, said controller driving said plurality of drive track assemblies.
7. The apparatus according to claim 6 wherein each of said pair of drive track assemblies is independently actuated in response to said controller to provide selective propulsion along only a pair of said plurality of drive track assemblies.
8. The apparatus according to claim 6, further comprising:
   a sensor system for gathering data, said sensor system being in communication with said controller.
9. The apparatus according to claim 1 wherein said power transmission system comprises:
   a plurality of drive members individually extending through each of said plurality of segments, each of said plurality of drive members driving at least a corresponding one of said plurality of drive track assemblies; and a plurality of universal joints pivotally interconnecting said plurality of drive members in series, thereby defining a continuous drive train driven by said power source.

10. The apparatus according to claim 1 wherein each of said plurality of articulating joints includes at least two degrees of freedom, each of said degrees of freedom being actuated by a separate actuator.

11. A robotic device comprising:
    a plurality of segments pivotally interconnected to form an elongated member;
    a plurality of drive track assemblies operably coupled to each of said plurality of segments, said plurality of drive track assemblies generally disposed in pairs about a periphery of each of said plurality of segments to provide traction at any position about said periphery;
    a power source;
    an articulating drive shaft rotatably driven by said power source; and
    a power transmission system interconnecting said articulating drive shaft and at least a portion of said drive track assemblies to drive said plurality of drive track assemblies.

12. The robotic device according to claim 11 wherein each of said plurality of drive track assemblies comprises:
    a continuous drive track;
    a drive gear operably coupled to said power transmission system;
    a driven gear enmeshingly engaging said drive gear; and
    a track gear fixed for rotation with said driven gear, said track gear enmeshingly engaging said continuous drive track to drive said continuous drive track to propel the apparatus.

13. The apparatus according to claim 11 wherein each of said plurality of drive track assemblies comprises:
    a continuous drive track having an environment engaging outer surface and a racked inner surface;
    a worm gear operably coupled to said power transmission system;
    a first gear enmeshingly engaging said worm gear;
    a second gear enmeshingly engaging said first gear;
    a third gear enmeshingly engaging said second gear, said third gear having a drive shaft fixed thereto for rotation therewith; and
    a pair of driven gears fixed to said drive shaft for rotation with said drive shaft, each of said pair of driven gears engaging said racked inner surface of said continuous drive track to drive said continuous drive track.

14. The robotic device according to claim 11 wherein each of said plurality of segments is identical and interchangeable.

15. The robotic device according to claim 11, further comprising:
    a head segment coupled to one of said plurality of segments;
    a controller mounted in said head segment, said controller driving said plurality of drive track assemblies; and
    a sensor system mounted in said head segment, said sensor system being in communication with said controller.

16. A robotic device for traversing obstacles, said robotic device comprising:
    a plurality of segments pivotally interconnected to form an elongated member;
    a plurality of drive track assemblies operably coupled to each of said plurality of segments, said plurality of drive track assemblies generally disposed about a periphery of each of said plurality of segments to provide traction at any position about said periphery;
    a power source;
    an articulating drive shaft rotatably driven by said power source;
    a power transmission system interconnecting said articulating drive shaft and at least a portion of said drive track assemblies to drive said plurality of drive track assemblies;
    a head segment coupled to one of said plurality of segments;
    a controller mounted in said head segment, said controller driving said plurality of drive track assemblies; and
    a sensor system mounted in said head segment, said sensor system being in communication with said controller.

17. The robotic device according to claim 16 wherein each of said plurality of drive track assemblies comprises:
    a continuous drive track;
    a drive gear operably coupled to said power transmission system;
    a driven gear enmeshingly engaging said drive gear; and
    a track gear fixed for rotation with said driven gear, said track gear enmeshingly engaging said continuous drive track to drive said continuous drive track to propel the apparatus.

18. The robotic device according to claim 16 wherein each of said plurality of drive track assemblies comprises:
    a continuous drive track having an environment engaging outer surface and a racked inner surface;
    a worm gear operably coupled to said power transmission system;
    a first gear enmeshingly engaging said worm gear;
    a second gear enmeshingly engaging said first gear;
    a third gear enmeshingly engaging said second gear, said third gear having a drive shaft fixed thereto for rotation therewith; and
    a pair of driven gears fixed to said drive shaft for rotation with said drive shaft, each of said pair of driven gears engaging said racked inner surface of said continuous drive track to drive said continuous drive track.

19. The robotic device according to claim 16 wherein a pair of said plurality of drive track assemblies is disposed on each of four sides of each of said plurality of segments to provide traction at any position about said periphery.

20. The robotic device according to claim 16 wherein each of said plurality of segments is identical and interchangeable.

* * * * *